United States Patent [19]

Watanabe

[11] Patent Number: 4,587,535

[45] Date of Patent: May 6, 1986

[54] LIQUID JET APPARATUS WITH PRESSURE SENSOR FOR INDICATING ABSENCE/PRESENCE OF LIQUID

[75] Inventor: Yoshitaka Watanabe, Tokyo, Japan

[73] Assignee: Canon Kabushiki Kaisha, Tokyo, Japan

[21] Appl. No.: 641,591

[22] Filed: Aug. 17, 1984

[30] Foreign Application Priority Data

Aug. 25, 1983 [JP] Japan ............................ 58-155555

[51] Int. Cl.$^{4}$ ..................... G01D 15/16; G01F 23/00

[52] U.S. Cl. ................................ 346/140 R; 73/303

[58] Field of Search .................. 346/140 PD, 140 IJ; 222/64; 73/303; 137/209

[56] References Cited

U.S. PATENT DOCUMENTS

| | | | |
|---|---|---|---|
| 4,183,031 | 1/1980 | Kyser et al. | 346/140 PD |
| 4,216,483 | 8/1980 | Kyser et al. | 346/140 PD |
| 4,241,357 | 12/1980 | Anestos | 346/140 IJ |
| 4,383,263 | 5/1983 | Ozawa et al. | 346/140 PD |
| 4,406,382 | 9/1983 | Roth | 222/64 |
| 4,417,232 | 11/1983 | Tewfik | 73/303 X |
| 4,422,084 | 12/1983 | Saito | 346/140 PD |

*Primary Examiner*—E. A. Goldberg
*Assistant Examiner*—Mark Reinhart
*Attorney, Agent, or Firm*—Fitzpatrick, Cella, Harper & Scinto

[57] ABSTRACT

An ink jet recording apparatus comprises: at least one ink jet head to emit a recording ink; main and sub ink tanks to store the ink which should be supplied to the head; a negative pressure generating device to generate a negative pressure to supply the ink from the sub ink tank into the head under the suction action; a pressure sensor, provided in the ink passage, for detecting whether the recording ink substantially remains or not in the sub ink tank when the negative pressure generating device operates. In response to a pressure variation in the ink passage, the pressure sensor determines that no ink substantially remains in the sub ink tank when the pressure in the ink passage is higher than a preset value, thereby generating a detection signal to supplement a new ink into the tank to a control circuit. Therefore, the absence of ink in the tank can be certainly detected and the ink can be emitted in good conditions, so that the recording can be smoothly performed by a simple, cheap and small-sized apparatus.

25 Claims, 7 Drawing Figures

LIQUID JET APPARATUS WITH PRESSURE SENSOR FOR INDICATING ABSENCE/PRESENCE OF LIQUID

BACKGROUND OF THE INVENTION

1. Field of the Invention

The present invention relates to a liquid jet apparatus such as, e.g., an ink jet recording apparatus and, more particularly, to means for detecting the substantial presence and absence of the liquid stored in the liquid storing means.

2. Description of the Prior Art

Liquid jet recording apparatuses such as an ink jet recording apparatus and the like are getting most of the attention as new recording means since they have advantages such that direct recording is possible, coloration is easy and noise is reduced. Particularly, on-demand type ink jet recording apparatus is becoming a principal full color printer technology since it is cheap and can be miniaturized.

However, conventionally, this kind of recording apparatus has the drawback that the emission of ink becomes unstable due to an increase in viscosity of ink since the volatile substance in the ink at the point of the recording head (ink jet head) may evaporate. Further, since it is necessary to form the ink tank, or recording liquid storing means, of flexible material, it is difficult to detect whether or not ink remains in the tank. Therefore, there is another drawback namely misrecording due to lack of ink. In the former case, it has been tried to remove the ink having increased viscosity from the orifice opening at the point of the head by an apparatus for preventing choking, so that a certain extent of effect is obtained. However, when the choking preventing apparatus and apparatus for detecting the amount of remaining ink in the tank are individually provided, the equipment becomes complicated, causing the size and cost of the apparatus to increase. In particular, an increase in the number of kinds of inks used for coloration or the like exacerbates this tendency. On the other hand, when the point of the head is capped for prevention of drying of the head, the ink meniscus at the point of the head retracts, thereby causing a drawback such that the recording (printing) becomes unstable.

SUMMARY OF THE INVENTION

It is therefore an object of the present invention to provide a liquid jet apparatus equipped with means for certainly detecting whether the liquid substantially remains or not in the liquid storing means by a simple constitution.

The meaning of substantially no liquid remains in the liquid storing means or the like includes the case where liquid of a very small quantity, such that liquid cannot be sufficiently emitted, in addition to the state whereby no liquid exists at all in the storing means.

According to an embodiment embodying the aspect of the invention under such object, the liquid jet apparatus comprises: jet head means for emitting a liquid; storing means for storing the liquid which should be supplied to the head means; pressure generating means for generating a pressure to feed the liquid to the head means from the storing means; and detecting means for detecting the substantial presence and absence of the liquid stored in the storing means when the pressure generating means is operating.

In the embodiment, the pressure generating means is constituted so as to generate a negative pressure such as, for example, a suction mechanism, while the detecting means is constituted so as to detect the substantial presence and absence of the stored liquid by detecting a variation in pressure in the liquid passage between the pressure generating means and the storing means.

Another object of the present invention is to provide a novel liquid jet apparatus which can simultaneously perform both detection of the substantial presence and absence of the liquid stored in the storing means and prevention of the choking of the head.

According to an embodiment under such an object, the detecting means is provided in a capping device for the head means in the form of pressure detecting means, and at this time the pressure generating means is coupled as suction means for generating a negative pressure to the capping device.

The above and other objects, features and advantages of the present invention will be apparent from the following detailed description in conjunction with the accompanying drawings.

BRIEF DESCRIPTION OF THE DRAWINGS

A preferred embodiment of the present invention will be described hereinbelow with reference to the accompanying drawings, in which.

DETAILED DESCRIPTION OF THE PREFERRED EMBODIMENT

With respect to an example whereby means for sensing a variation in pressure is provided in the meniscus recovery system, the description will be made hereinbelow in the sequence of the constitution and operation of one example of a liquid jet recording apparatus to which the invention is employed.

Figure 1:
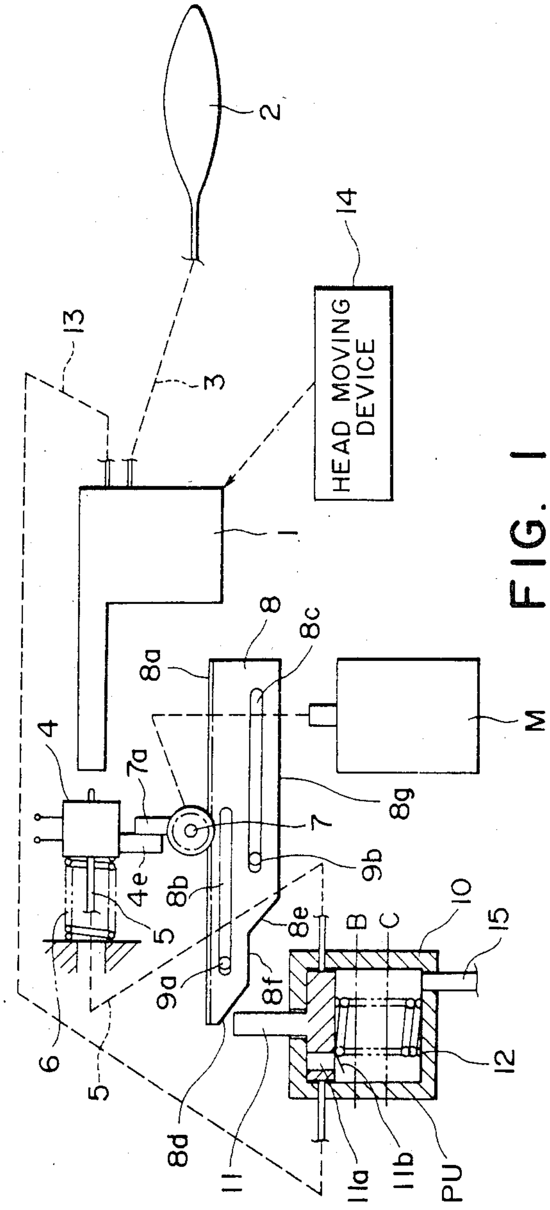
FIG. 1 is a constitutional diagram of an embodiment in the case where the present invention is applied to a liquid jet recording apparatus.

In FIG. 1, a pulse motor M controls the operations of a capping device and a pump which will be explained later. A reference numeral 1 denotes a liquid jet head unit including at least one liquid jet head; 2 denotes a recording liquid storing member of the exchangeable cartridge type (hereinbelow, referred to as a main ink tank); 3 denotes a flexible tube for supplying a recording liquid (hereinafter, may be simply referred to as an ink) from the main ink tank 2 to the head unit 1; and 4 denotes a capping device equipped with pressure detecting means and its details will be explained later in conjunction with FIG. 2. A tube 5 couples the head unit 1 through the capping device 4 with a suction pump PU which will be mentioned later. A spring 6 is supported to the fixed portion of the apparatus and presses the capping device 4 equipped with the pressure detecting means in the direction of the head unit 1. A gear 7 is driven by the pulse motor M. A lever 7a is fixed to the gear 7 and is rotated integrally with the gear 7. The lever 7a comes into engagement with a lever 4e provided for the capping device 4, thereby restricting the location of the capping device 4. A slide lever 8 has a rack portion 8a adapted to engage the gear 7 and long holes 8b and 8c and is slid to the right and left in the diagram along pins 9a and 9b planted in the fixed portion of the apparatus in association with the rotations of the pulse motor M and gear 7. Two-level different shapes 8f and 8g are formed at the lower portion of the slide lever 8 due to chambered portions 8d and 8e.

A numeral 10 represents a cylinder of the suction pump PU; 11 denotes a piston; 11a and 11b respectively denote a through hole and a valve thereof; 12 a spring for pressing the piston 11 upwardly in the diagram; 13 a tube for coupling the pump PU with a sub ink tank 1e of the head unit 1 (FIG. 2); and 15 denotes a drain tube coupled to a drain tank (not shown).

A numeral 14 denotes a head moving device for moving the head unit 1 in the direction perpendicular to the drawing plane for recording. In this case, the capping device 4 is arranged so as to face the head unit 1 when the head unit 1 is moved to a predetermined location (home position) which is deviated by a predetermined range for recording.

Figure 2:
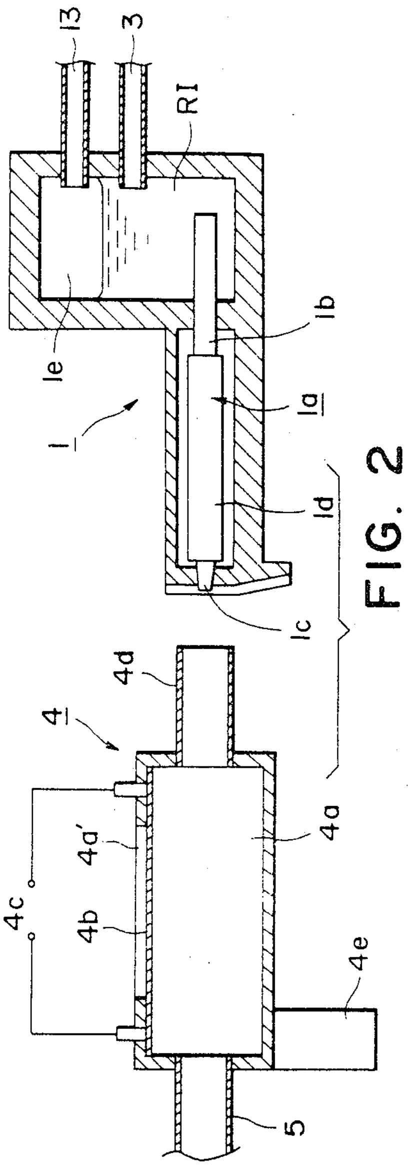
FIG. 2 illustrates cross sectional views showing the details of a capping device and a head unit in FIG. 1.

FIG. 2 shows cross sectional views of the head unit 1 and capping device 4 in FIG. 1, in which a numeral 1a denotes at least one liquid jet head which has an orifice opening 1c and consists of a nozzle 1b and a cylindrical piezo element 1d; 1e denotes the sub ink tank; and RI indicates an ink in the subtank 1e. The sub tank 1e is coupled to main ink tank 2 and pump PU through the tubes 3 and 13, respectively.

A numeral 4d denotes a cap portion of the capping device; 4a a pressure chamber communicated with the cap portion; 4b a pressure sensor which is constituted by e.g., a strain gauge or a piezoelectric element or the like and is attached to an opening 4a' of the pressure chamber 4a by means of an adhesive or the like to prevent the leakage of the ink; and 4c an output terminal of the sensor 4b.

Figure 3:
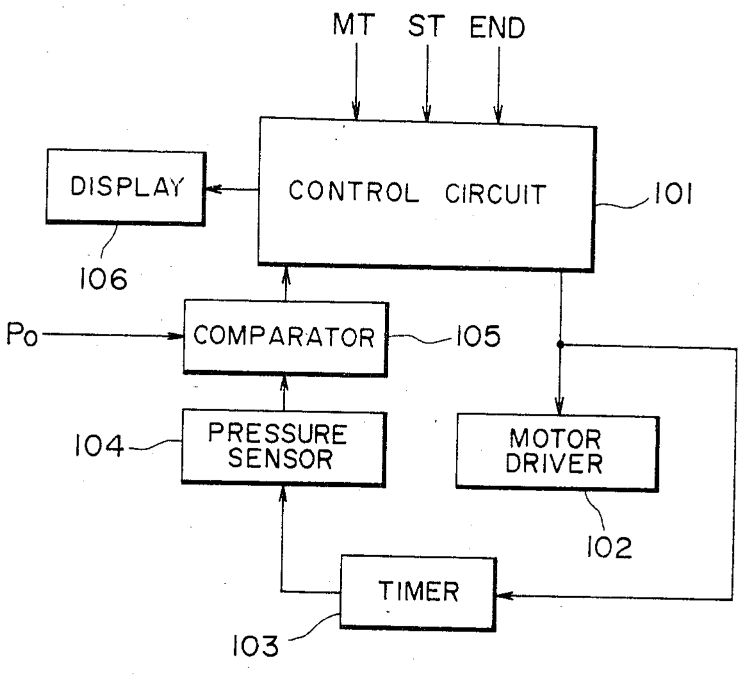
FIG. 3 is a block diagram of the control system of the apparatus of FIG. 1.

FIG. 3 shows the control system of the liquid jet recording apparatus of FIG. 1, in which 101 denotes a control circuit; 102 a driver for the motor M; 103 a timer; 104 a pressure sensor; 105 a comparator; and 106 a display.

Next, the operation of the apparatus of FIGS. 1 to 3 will be explained with reference to the graph of the pressure change characteristic in the pressure chamber 4a shown in FIG. 4 and flowcharts shown in FIGS. 5A and 5B.

Figure 5B:
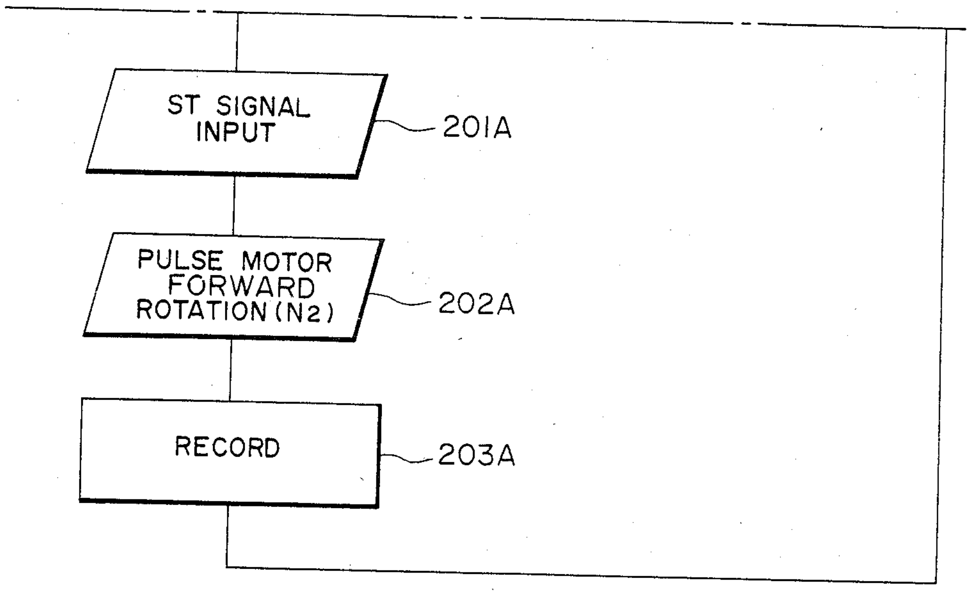
FIGS. 5A and 5B are a set of flow charts for explaining the operation of the apparatus shown in FIGS. 1 to 3.
Figure 5:
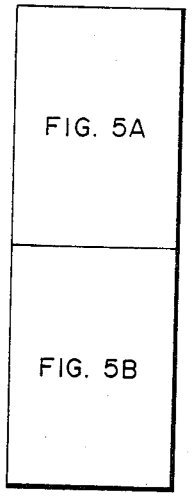
FIG. 5 is a diagram showing the arrangement of FIGS. 5A and 5B.
Figure 5A:
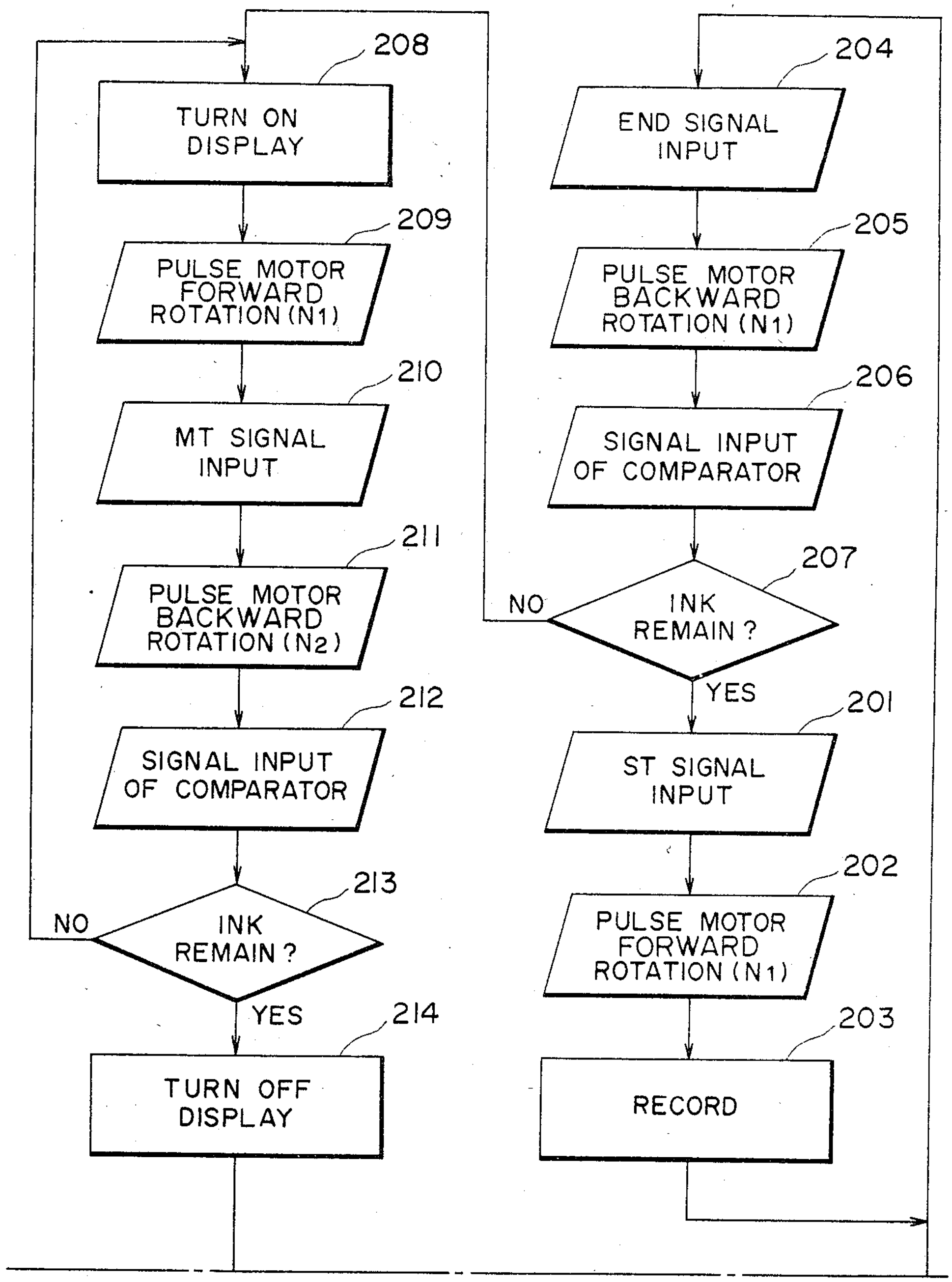

(1) When a recording start signal ST is inputted to the control circuit 101, the pulse motor M is rotated in a forward direction by the control circuit 101 through the motor driver 102 by only an amount corresponding to a predetermined number $N_1$ of pulses (steps 201 and 202 in FIG. 5A). The gear 7 is rotated counterclockwise in FIG. 1 in association with the forward rotation of the pulse motor M, so that the capping device 4 to which the pressure detecting means (4a, 4b) are attached goes away from the head unit 1 by the levers 7a and 4e. Thereafter, the head unit 1 is moved by the head moving device 14, thereby allowing the ink to be emitted in association with this movement, so that the recording is performed as in the usual manner (step 203).

(2) After the completion of the recording, the head unit 1 is returned to the home position. Thereafter, when a recording end signal END is inputted to the control circuit 101, the motor M is rotated in a backward direction by only an amount corresponding to the pulse number $N_1$ (steps 204 and 205). This allows the gear 7 to be rotated clockwise, so that the capping device 4 is moved to the right in FIG. 1 due to the operation opposite to (1) and the cap portion 4d is coupled to the point of the head unit 1. When the gear 7 is further rotated, the slide lever 8 is moved to the left due to the engagement between the rack portion 8a and the gear 7, thereby depressing the piston 11 of the pump PU to a level indicated at B. At this time, the pressure in the pressure chamber 4a becomes a level indicated at A in FIG. 4. The driving of the pulse motor M is stopped in this state and the slide lever 8 is held at this location. The location of the lever 8 may be kept due to the torque of the pulse motor M without cutting off the excitation of the motor M for this purpose. Or, it may be maintained due to the frictional force between the slide lever 8 and the piston 11 pressed upwardly by the spring 12.

Figure 4:
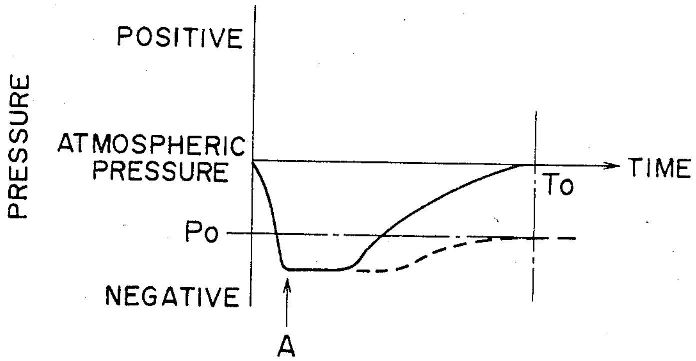
FIG. 4 is a graph showing the pressure change characteristics of a pressure chamber in the capping device in FIGS. 1 and 2.

(3) After a time $T_0$ (FIG. 4) which is determined by setting the timer 103 has elasped, the pressure in the pressure chamber 4a changes as the time passes as indicated by the solid line in FIG. 4 by supplying the ink into the sub ink tank 1e if the ink RI remains in the main ink tank 2 as the main recording liquid storing chamber; as a result, it returns to the atmospheric pressure. On the contrary, when no ink RI remains in the main ink tank 2, the above-mentioned pressure changes as indicated by the broken line and stops at a pressure of $P_0$ and will not return to the atmospheric pressure.

Therefore, an output of the pressure sensor 104 (e.g., strain gauge 4b in FIG. 2) is inputted to the comparator 105 and is compared with the preset value $P_0$, thereby enabling the presence and absence of the ink in the main ink tank 2 to be detected (step 206). The presence and absence of the ink denote that the recording liquid (ink) substantially remains or not as mentioned before.

(4) When a comparison output of the comparator 105 is inputted to the control circuit 101, in the case where it is a signal indicative of the absence of ink, the control circuit 101 allows the display 106 to indicate "no ink" (visual or audible warning indication may be possible). The control circuit 101 also allows the pulse motor M to be rotated in the forward direction and permits the capping device 4 to be detached from the head unit 1 and stops the operation of the whole system (steps 207 to 209; the first state). On the other hand, when a signal representative of the presence of the ink is inputted, in more detail, when the input signal indicates that an output signal of the sensor 104 is larger than the preset value $P_0$, the capped state is held until the next recording start signal ST is inputted (steps 207 and 201; the second state).

Practically speaking, as mentioned above, when the recording start signal ST is inputted, the motor M is rotated in the forward direction to detach the capping device 4 from the head unit 1. At the same time, a small quantity of ink remaining the upper chamber of the pump PU is moved to the lower chamber through the through hole 11a and valve 11b due to the upward movement of the piston 11. This ink is drained to a drain tank (not shown) through the drain tube 15 at the time of next capping, i.e., when the pressure is detected.

According to the foregoing embodiment, since the orifice opening 1c of the nozzle 1b of the head 1a is held with the cap attached (in the closed state), it is possible to prevent the volatile substance in the ink from being evaporated from the point of the orifice. Further, even when the meniscus of the ink is moved backward when the nozzle is capped, the meniscus is returned because of the suction due to the negative pressure of the pump PU. Therefore, it is possible to prevent unstable ink emission due to an increase in viscosity of the ink and the backward movement of the meniscus at the time of next recording.

(5) When the user exchanges to a new main ink tank in the first state of the above process (4), in response to the input of an ink exchange signal MT at that time (a signal by a manual switch or the like, not shown), the control circuit 101 permits the pulse motor M to be rotated in the backward direction through the motor driver 102 by only an amount corresponding to a predetermined number $N_2$ of pulses larger than the above-mentioned number $N_1$ (steps 210 and 211). Due to this, the capping operation for the head unit 1 and the operation for depressing the piston of the pump PU are carried out similarly to the process (2). However, since a rotational amount of the pulse motor M is large in this case, the slide lever 8 is moved until the second state level-different portion 8*g* depresses the piston 11, so that the piston 11 descends to the level C. Consequently, the pump PU generates a negative pressure larger than that by the ordinary operation, thereby supplying a large quantity of ink RI from the main ink tank 2 to the sub ink tank 1*e*. Thus, the head 1*a* is recovered such that the ink emission can be preferably performed.

(6) After the elapse of a predetermined time interval, the output of the pressure sensor 104 is compared with the preset value $P_0$ by the comparator 105, thereby detecting the presence and absence of the remaining ink RI in the main ink tank 2 (steps 212 and 213). In this case also, the presence and absence of the ink denote that the recording liquid (ink) substantially exists or not similarly to the above. As a result, when no ink RI remains, the operations corresponding to the steps 208 to 211 are repeated. However, when the ink RI remains, the indication by the display 106 is turned off and the capped state is held until the next recording start signal ST is inputted (step 214). When the next recording start signal ST is inputted, the pulse motor M is rotated in the forward direction by only an amount corresponding to the pulse number $N_2$, so that the capping device 4 is removed from the head unit 1 and the recording is executed similarly to the above (steps 201A to 203A).

In the above embodiment, the pressure variation sensing means has been provided in the ink meniscus recovery system and, as the embodiment of this invention, this constitution is considered to be most advantageous from the viewpoints of simplicity of constitution and certainty of detection. However, the invention can be also implemented by providing the pressure variation sensing means at any portion in the recording liquid supplying system (e.g., in the tube 3 or 13 in FIG. 1).

As described above in detail, according to the invention, in the liquid jet apparatus, a variation in pressure at any portion in the liquid supplying system or meniscus recovery system is sensed when the pressure generating means operates, and the liquid stored in the liquid storing means is detected to see if it substantially remains or not. Therefore, it is possible to certainly detect whether the liquid in the liquid storing means substantially remains or not without individually providing means for detecting a quantity of remaining liquid. Also, the liquid can be emitted in the good condition. The apparatus is simple and it can be miniaturized and the cost can be reduced.

What I claim is:

1. A liquid jet apparatus comprising:

liquid jet head means for emitting a liquid;

liquid storing means for storing a liquid to be supplied to said head means;

pressure generating means for generating a negative pressure to suck said liquid from said head means; and detecting means for detecting the substantial presence and absence of liquid in said storing means, said detecting means being arranged to determine whether or not liquid is substantially present in said storing means when a predetermined period of time has elapsed after said pressure generating means operated.

2. An apparatus according to claim 1, wherein said detecting means is arranged to detect the substantial presence and absence of liquid in said storing means on the basis of a variation in pressure in a liquid passage between said storing means and said pressure generating means.

3. An apparatus according to claim 2, wherein said detecting means is arranged to respond to a pressure variation in a liquid passage between said head means and said pressure generating means.

4. An apparatus according to claim 2, wherein said detecting means is arranged to respond to a pressure variation in a liquid passage between said head means and said storing means.

5. An apparatus according to claim 2, wherein said detecting means is arranged to determine that there is substantially no liquid stored in said storing means when the pressure in said liquid passage upon operation of said pressure generating means is lower than a predetermined value.

6. An apparatus according to claim 5, further comprising capping means for capping a liquid jet portion of said head means, wherein said detecting means is provided in a part of said capping means.

7. An apparatus according to claim 6, wherein said pressure generating means is coupled to said capping means.

8. An apparatus according to claim 2, further comprising capping means for capping a liquid jet portion of said head means, wherein said detecting means is provided in a part of said capping means.

9. An apparatus according to claim 8, wherein said pressure generating means is coupled to said capping means.

10. An apparatus according to claim 1, further comprising capping means for capping a liquid jet portion of said head means, wherein said detecting means is provided in a part of said capping means.

11. An apparatus according to claim 10, wherein said pressure generating means is coupled to said capping means.

12. An apparatus according to claim 1, further comprising warning means for generating a warning when it is detected that there is substantially no liquid stored in said storing means.

13. An ink jet recording apparatus comprising:

at least one ink jet head having an ink emitting orifice;

an ink tank communicated with said head;

capping means for capping the orifice of said head;

suction means, coupled to said capping means, for sucking ink in said tank through said capping means; and detecting means, provided for said capping means, for detecting the substantial presence and absence of ink in said ink tank, said detecting means being arranged to determine whether or not ink is substantially present in said ink tank when a predetermined period of time has elapsed after said suction means operated.

14. An apparatus according to claim 13, wherein said detecting means includes a pressure sensor.

15. An apparatus according to claim 14, wherein said detecting means further includes a discriminating circuit for determining that there is substantially no ink in said ink tank when the pressure detected through said pressure sensor is lower than a predetermined value.

16. An apparatus according to claim 15, further comprising warning means for generating a warning when it is determined that there is substantially no ink in said ink tank in response to said discriminating circuit.

17. An ink jet recording apparatus using an exchangeable ink cartridge, comprising:

at least one ink jet head having an ink emitting orifice;

an ink tank communicated with said head;

communicating means for communicating said ink tank with said ink cartridge;

capping means for capping the orifice of said head;

suction means, coupled to said capping means, for sucking ink through said capping means; and detecting means, provided for said capping means, for detecting the substantial presence and absence of ink in said ink cartridge, said detecting means being arranged to determine whether or not ink is substantially present in said ink cartridge when a predetermined period of time has elapsed after said suction means operated.

18. An apparatus according to claim 17, wherein said detecting means includes a pressure sensor.

19. An apparatus according to claim 18, wherein said detecting means further includes a discriminating circuit for determining that there is substantially no ink in said ink cartridge when the pressure detected through said pressure sensor is lower than a predetermined value.

20. An apparatus according to claim 19, further comprising warning means for generating a warning when it is determined that there is substantially no ink in said ink cartridge in response to said discriminating circuit.

21. An apparatus according to claim 17, wherein said suction means has a first operating mode for generating a first negative pressure to recover said ink jet head from an unstable ink emitting state and a second operating mode for generating a second negative pressure to supply ink to said ink tank from an exchanged ink cartridge, said second negative pressure being different from said first negative pressure.

22. An apparatus according to claim 21, wherein said detecting means is arranged to operate in the first operating mode of said suction means.

23. An apparatus according to claim 21, wherein said first negative pressure is lower than said second negative pressure.

24. An ink jet recording apparatus using an exchangeable ink cartridge, comprising:

at least one ink jet head having an ink emitting orifice;

an ink tank communicated with said head;

communicating means for communicating said ink tank with said ink cartridge;

capping means for capping the orifice of said head; and suction means, coupled to said capping means, for sucking ink through said capping means, said suction means having a first operating mode for generating a first negative pressure to recover said ink jet head from an unstable ink emitting state and a second operating mode for generating a second negative pressure to supply ink to said ink tank from an exchanged ink cartridge, said second negative pressure being different from said first negative pressure.

25. An apparatus according to claim 24, wherein said first negative pressure is lower than said second negative pressure.

* * * * *

UNITED STATES PATENT AND TRADEMARK OFFICE
CERTIFICATE OF CORRECTION

PATENT NO. : 4,587,535

DATED : May 6, 1986

INVENTOR(S) : YOSHITAKA WATANABE

It is certified that error appears in the above-identified patent and that said Letters Patent is hereby corrected as shown below:

Abstract, line 1, change "comprises: at" to --comprises at--.

Column 1, line 31, change "drawback namely" to --drawback, namely--;
line 54, change "of substantially" to --of "substantially--;
line 55, change "means or the like" to --means" or the like--; and
line 56, after "quantity" insert --exists--.

Column 2, line 38, change "flow charts" to --flowcharts--.

Column 3, line 12, change "chambered" to --chamfered--; and
line 31, change "le" to --le-- (bold type).

Column 4, line 60, change "ink remaining the" to --ink remaining in the--.

Column 7, line 2, before "tank" insert --ink--.

Signed and Sealed this

Thirteenth Day of January, 1987

*Attest:*

DONALD J. QUIGG

*Attesting Officer*

*Commissioner of Patents and Trademarks*